United States Patent
Babin

(10) Patent No.: US 7,635,854 B1
(45) Date of Patent: Dec. 22, 2009

(54) METHOD AND APPARATUS FOR OPTICAL LEVEL SENSING OF AGITATED FLUID SURFACES

(75) Inventor: Francois Babin, Quebec (CA)

(73) Assignee: Institut National D'Optique, Saint-Foy, Quebec (CA)

( * ) Notice: Subject to any disclaimer, the term of this patent is extended or adjusted under 35 U.S.C. 154(b) by 0 days.

(21) Appl. No.: 12/169,872

(22) Filed: Jul. 9, 2008

(51) Int. Cl.
  *G01N 15/06* (2006.01)
  *G01F 23/00* (2006.01)
(52) U.S. Cl. .................. 250/573; 250/577; 73/293; 356/436
(58) Field of Classification Search ............... 250/573, 250/576, 577; 73/290 R, 293; 356/4.01, 356/5.01, 436, 440
See application file for complete search history.

(56) References Cited

U.S. PATENT DOCUMENTS

| | | | |
|---|---|---|---|
| 4,692,023 | A | 9/1987 | Ohtomo et al. |
| 4,938,590 | A | 7/1990 | Ishida |
| 5,194,747 | A | 3/1993 | Culpepper et al. |
| 5,257,090 | A | 10/1993 | Melngor et al. |
| 5,284,105 | A | 2/1994 | Wilkins |
| 5,284,106 | A | 2/1994 | Wilkins |
| 5,291,031 | A | 3/1994 | MacDonald et al. |
| 5,305,237 | A | 4/1994 | Dalrymple et al. |
| 5,321,408 | A | 6/1994 | Jean et al. |
| 5,648,844 | A | 7/1997 | Clark |
| 6,107,857 | A | 8/2000 | Cramar et al. |
| 6,107,957 | A | 8/2000 | Cramer et al. |
| 6,339,468 | B1 | 1/2002 | Clifford et al. |

(Continued)

FOREIGN PATENT DOCUMENTS

WO    WO 2008/024910 A2    2/2008

OTHER PUBLICATIONS

Maatta, Kari et al. "High Accuracy Liquid level meter based on pulsed time of flight principle" SPIE vol. 3100 pp. 268-277, Sep. 1997.

*Primary Examiner*—Kevin Pyo
(74) *Attorney, Agent, or Firm*—Merchant & Gould P.C.

(57) ABSTRACT

A method and apparatus provide for non-contact optical measurement of the level of a fluid stored in a tank or container, the surface of the fluid being possibly agitated. The method processes numerically the digitized signal waveforms generated by a lidar apparatus based on a pulsed time-of-flight modulation scheme. A key step of the numerical processing is the computation of a waveform in which each data point is obtained from a statistical estimator of the variability of the amplitude signal echo measured at the distance from the lidar apparatus that corresponds to the rank of the data point in the waveform. The statistical estimator is preferably the standard deviation. By using a statistical estimator of the variability of the captured signal amplitude, the specific signal echo returned from an agitated fluid surface can be greatly amplified as compared to the signal echoes returned from any obstacle or medium that could be present along the path of the optical beam radiated by the lidar apparatus. The method then allows for an efficient retrieval of the useful signal echo from which the level of the fluid surface can be reliably measured with greater accuracy, particularly in situations where the useful signal echo would be buried in a strong signal echo returned from any optically scattering or absorbing medium that would fill in the volume of the tank above the fluid surface.

9 Claims, 7 Drawing Sheets

U.S. PATENT DOCUMENTS

| | | |
|---|---|---|
| 6,407,803 B1 | 6/2002 | Schrank |
| 6,539,794 B1 | 4/2003 | Otto et al. |
| 6,759,977 B1 | 7/2004 | Edvardsson et al. |
| 7,082,828 B1 | 8/2006 | Wilkins |
| 7,199,388 B2 * | 4/2007 | Omatoi ................ 250/573 |

* cited by examiner

METHOD AND APPARATUS FOR OPTICAL LEVEL SENSING OF AGITATED FLUID SURFACES

FIELD OF THE INVENTION

This invention generally relates to a method and apparatus for fluid-level measurement, and more particularly for the optical measurement of the surface level of an agitated fluid under degraded visibility conditions.

BACKGROUND OF THE INVENTION

Various types of instruments have been developed for applications related to the monitoring of tank contents, wherein the level of stored materials in either liquid, solid, or slurry state must be measured, either continuously or by discrete height steps. The expressions level measurement and tank gauging refer to the measurement of the height of the top surface of a material stored in a tank or the measurement of the vertical distance that separates the surface of the material from a reference level and are used herein interchangeably. Traditional levelmeter devices include dipsticks, either in manual or electronic form, mechanical float levelmeters, capacitive RF levelmeters, and photoelectric levelmeters. More recent levelmeters based on technologies that allow measurements without contact with the stored material have now gained wide acceptance for use in a broad variety of tank-gauging applications. These technologies rely mostly on the radar principle, that is, they take advantage of the fact that the surface of most materials can reflect a part of ultrasonic or electromagnetic wave energy that strikes it. Ultrasonic and microwave radar transceivers can be located, for instance, at the top of a tank to generate probe waves that propagate down to the surface of the material. A part of the radiated energy is then reflected off the surface material and returns to the transceiver for detection and measurement of the distance to the surface. These tank-gauging devices operate according to various modulation schemes, among which two of the most frequently encountered are the frequency-modulated continuous-wave (FMCW) modulation and the pulsed time-of-flight (TOF) modulation.

Contrary to their ultrasonic counterparts, the accuracy of level measurements made with tank-gauging devices based on microwave radar technology is not sensitive to changes in ambient temperature, pressure, and moisture level in the volume above the surface of the material. Microwave tank-gauging radars can perform level measurements for a broad range of materials, provided that their dielectric constants are high enough. The waves generated by both ultrasonic and small-size microwave tank-gauging radars diverge appreciably during their propagation unless they are confined within a waveguiding structure in the form of a still pipe that extends vertically from the top of the tank down to its bottom. Otherwise, the operation of both types of tank-gauging devices is often plagued by false return echoes due to spurious reflections of the wave energy on the walls of the tank or on the obstacles that could be present in it. More dramatically, the presence of a vertical pipe that comes in contact with the stored material is a major concern for several applications. Such applications include for example the gauging of tanks containing materials that are corrosive or that must be held at either elevated or cryogenic temperatures. In addition, food processing, chemical, and pharmaceutical industries often require that the interior of storage tanks be free of any structure that could contaminate the stored materials or that is difficult to clean.

Less intrusive tank-gauging devices that operate according to the radar principle can be built around optical rangefinder, laser radar, or lidar (LIght Detection And Ranging) technologies, which rely on the emission of optical beams for measuring the distance of remote objects. The optical sources integrated in most lidar devices adapted for tank-gauging applications emit at wavelengths in the visible or near-infrared region of the electromagnetic spectrum, so that their emission wavelengths are shorter than those of microwave radars by orders of magnitude. As a consequence, the emitted light can propagate over long distances in the form of a narrow optical beam, without the need for being channeled by a waveguiding structure. lidar tank-gauging devices are then ideal for non-contact level sensing applications in which non-intrusiveness is of the utmost importance. This major asset comes from the fact that the entire device assembly can be located outside of the tank while the communication of the device with the interior of the tank is enabled by an optical window mounted in an access port of the tank or on the front panel of the device. lidar tank-gauging devices are then well suited for use in harsh environments since tightly-sealed safety windows can be made, for instance, from a highly-resistant optical material that withstands pressures that exist inside pressurized tanks. In some cases, material build-up or dust deposit on the inner surface of an optical window can be prevented by using a wiper, as taught in U.S. Pat. No. 5,284,105 to Wilkins, or by enclosing the window in a compressed-air chamber that is kept opened during measurements, as disclosed in U.S. Pat. No. 6,407,803 to Schrank. Finally, lidar tank-gauging devices are generally less expensive than their microwave radar counterparts while they can perform level sensing of liquids having low dielectric constants.

In contrast with most ultrasonic and microwave radar instruments, lidar devices are particularly well suited for gauging of tanks that contain flammable materials or in which an explosive gas atmosphere may develop. This is due to the fact that these devices can be designed in the form of an electronic/control unit remotely connected to an optical head unit that is free of any electronics and electrical wiring, so that they can be made intrinsically safe. The control unit can then be located at a safe distance, well away from the tank containing a flammable or explosive material. Fiber optic cables or other types of light transmission means link both units. As a consequence, no electrical signal is conveyed between the optical head unit and the electronic/control unit. lidar tank gauges and liquid-level measurement devices designed in this fashion are taught in U.S. Pat. No. 4,692,023 to Ohtomo et al., U.S. Pat. No. 4,938,590 to Ishida, U.S. Pat. No. 5,194,747 to Culpepper et al., U.S. Pat. No. 5,291,031 to MacDonald et al. U.S. Pat. No. 6,339,468 to Clifford et al., and in the following paper from K. Määttä et al. "High accuracy liquid level meter based on pulsed time-of-flight principle", (*Proceedings of the SPIE*, vol. 3100, pp. 268-277, 1997). Moreover, the optical head unit may comprise only a few passive optical components and mounting hardware, which serve to condition the emitted optical beam and to collect the return optical signal. The optical head unit is then intrinsically safe without any real need for being housed in an explosion-proof enclosure since neither electrical sparks nor local heat build-up can take place in it. Finally, lidar tank-gauging devices radiate light beams having optical irradiance levels well below the ignition threshold of even the most explosive gas atmospheres.

The surface of a liquid contained in a storage tank reflects a fraction of an optical beam incident on it due to the refractive-index mismatch at the interface between the material and the overlying atmosphere. For example, the air-water interface has a reflectance of about 2% at visible wavelengths and close to normal incidence. If desired, a highly reflecting object can be made floating on the surface of the liquid to increase the optical feedback well above the 2% fraction mentioned above. U.S. Pat. No. 4,938,590 to Ishida, U.S. Pat. No. 5,257,090 to Meinzer et al., U.S. Pat. No. 5,291,031 to MacDonald et al., U.S. Pat. No. 7,082,828 to Wilkins, and Pat. application WO2008/024910 to Nino et al. all disclose lidar tank gauges and liquid-level measurement devices that make use of a floating reflector. Various types of floating reflectors can be used such as stripes of reflective tape scotched to a floating object, a conventional plane mirror, a single corner-cube retroreflector or an array of retroreflecting cubes. Although a reflector increases substantially the optical feedback from the surface to be gauged, a lidar tank gauge that operates with such a reflector can no longer be qualified as a non-contact instrument. Hence, the reflector can contaminate the liquid stored in the tank, or the liquid itself can corrode the reflector. Above all, the need to enclose the floating reflector in a vertical pipe in order to prevent the reflector from moving outside of the surface area illuminated by the light beam is a serious drawback. The instrument then becomes very intrusive.

There is therefore a clear advantage in designing a lidar tank-gauging instrument that provides sufficient sensitivity to operate with its light beam being reflected off the bare surface of a liquid, without any solid reflector floating thereon. The collection of the return optical signal can be maximized by optically boresighting the emission and collection channels of the instrument in such a way that the light reflected off the liquid surface remains within the field of view of the collection channel over a predetermined level interval to be covered by the instrument. In fact, the optical boresighting of the instrument as well as its alignment relative to the normal to the liquid surface must be finely tuned since the surface of a still liquid reflects light mostly in a specular manner, like a plane mirror. This means that the light remains highly directional after its reflection off the surface, in contrast with the diffuse reflection of light upon an unpolished solid surface, which diverts light over a broad solid angle dictated by the roughness of the solid surface.

The performance of several lidar tank-gauging devices that operate in a quite satisfactory manner when monitoring the surface level of liquids at rest degrades dramatically when the top surface of the liquid gets agitated. Let's mention for example the measurement of the level of liquids stored in tanks mounted in transportation means such as railway tank cars, highway truck trailers, cargo tanks or other types of floating vessels. Boiling liquids have their top surface agitated as well. The surface of a liquid can also be agitated during both loading and unloading of a tank. For example, the impact of the filling stream with the liquid surface may generate surface waves of sizeable amplitude during a loading process. The consequences can be dramatic in these conditions since the reading from the tank-gauging device often serves to control both loading and unloading processes, based on the amount of material that is transferred. In fact, the correct operation of a tank-gauging instrument during both loading and unloading processes is critical for most applications since the level measurements are often performed only during these events. Finally, some materials stored in the form of liquids or slurries must be stirred on a continuous basis, without any shutdown of the agitation being allowed for monitoring their top surface level.

At any given position on the surface of an agitated liquid or slurry, the height of the surface will generally swing up and down, either randomly or in a roughly periodic manner, due to the presence of surface waves. By itself, the presence of surface waves or of other types of turbulent conditions in the fluid can be tackled without major difficulties by integrating the instantaneous reading from a lidar tank-gauging device over a convenient measurement period to give an accurate indication of the mean surface level. One primary requirement is then to select the measurement period much longer than the period of the surface wave undulations. Unfortunately, the presence of waves or turbulent conditions at the surface of a liquid also means that the local inclination or tilt angle of the limited surface area that is illuminated by the probe optical beam no longer remains in fixed relationship with the vertical propagation axis of the optical beam. The inclination of the liquid surface fluctuates more or less rapidly according to the period of the surface waves. As a consequence, a fraction (or even all) of the light specularly reflected from this surface area can be directed out of the solid angle subtended by the collection channel of the tank-gauging device as seen from the liquid surface. The collected return signal can then exhibit sizeable amplitude fluctuations, which will often adversely affect the tracking of the useful signal echo coming from the reflection off the liquid surface. Note that this problem persists when using a solid plane reflector that floats on a liquid surface. U.S. Pat. No. 5,648,844 to Clark discloses a liquid-level sensor that is intended to provide better performance for level sensing of agitated fluids. The light source enclosed in the disclosed apparatus emits an optical beam that passes through an optical diffuser before escaping from the emitter module of the apparatus. In addition to enlarging the optical spot size on the surface of the liquid, an optical diffuser of the holographic type also causes a remapping of the optical irradiance distribution to give it a more circular shape without hot spots. Unfortunately, the use of an optical diffuser does not fully eliminate the amplitude fluctuations of the returned signal, particularly when the wavelength of the waves at the surface of the liquid compares to the diameter of the optical spot size. In addition, the optical losses undergone during passage through the diffuser and the need for enlarging the field of view of the optical receiver can degrade the signal-to-noise ratio of the recorded signals.

The challenge of remotely measuring the level of disturbed liquid surfaces arises when using microwave tank-gauging radars as well. For example, U.S. Pat. No. 6,759,977 to Edvardsson et al. reports that the signal strength of the radar echo from a turbulent surface can be reduced by about 6 to 20 dB, depending on the size of the antenna of the microwave tank gauge. U.S. Pat. No. 5,321,408 to Jean et al. and U.S. Pat. No. 6,107,957 to Cramer et al. disclose methods for processing in the frequency domain the FMCW microwave radar signals to get more accurate level measurements in presence of agitated fluid surfaces. The methods rely on spectral averaging and/or spectral filtering of the frequency domain signals, and they are not intended for implementation in tank-gauging devices that operate according to the pulsed TOF principle. Likewise, U.S. Pat. No. 6,539,794 to Otto et al. teaches an apparatus for measuring the level of agitated fluids or materials stored in a container, the apparatus being based on a microwave radar that operates in combination with a set of limit sensors disposed at various heights on the inner wall surface of the container, thus making the apparatus relatively intrusive.

The level sensing of an agitated liquid surface becomes even more difficult when the liquid is also temporarily out of thermodynamical equilibrium with its environment. Depending on the nature of the liquid and of its temperature, these non-equilibrium conditions can lead to the formation of fog in the atmosphere above the liquid surface. For example, such conditions often prevail during the loading of tank carriers for maritime transportation of liquefied natural gas (LNG). Likewise, the loading of a tank with a high-pressure filling stream generally causes the formation of clouds of droplets in the atmosphere above the liquid surface. The difficulty to perform level measurements in both types of conditions, which can occur simultaneously, originates from the fact that fog and droplet clouds can absorb and/or scatter a sizeable fraction of the optical beam energy during the beam propagation from the tank-gauging device to the liquid surface and then back to the device. The situation compares with the degraded visibility conditions caused by the presence of fog in the air. For the specific case of the LNG, which consists primarily of methane, the presence of even small amount of other hydrocarbon species such as butane, ethane, and propane can result in some resonant absorption of the optical beam energy, even though the methane itself is totally transparent at the emission wavelength of the tank-gauging device. The absorption and scattering of the optical beam energy will manifest as a significant attenuation of the echo returned from the liquid surface along with the presence of a more or less intense false signal echo. This false signal echo comes from the part of the backscattered optical energy that is captured by the optical receiver of the tank-gauging device, and it spatial extent covers the distance interval from the device down to the liquid surface. In some circumstances, the distance-averaged amplitude of the false signal echo can exceed the useful signal echo. Stated otherwise, the useful signal echo can be buried within an intense background signal that prevents from reliably measuring the liquid surface level with the desired accuracy.

From the review of the prior art detailed in the preceding paragraphs, there is a need for methods and devices that could perform level measurements of agitated fluids stored in various types of containers or tanks and under degraded visibility conditions, the methods being preferably suited for implementation in lidar tank-gauging devices based on the pulsed TOF principle.

OBJECTS OF THE INVENTION

It is therefore a first object of the present invention to provide a lidar apparatus based on a pulsed time-of-flight modulation scheme in combination with digitization of the captured signal waveforms, and which can perform accurate and reliable measurements of the level of agitated fluids stored in containers or tanks, without any contact with the fluids.

Another object of the present invention is to provide a method that enables successful retrieval of the signal echo returned from an agitated fluid surface, the method being intended for implementation in the processing unit of a lidar apparatus adapted for level sensing applications wherein the distance to a fluid surface is determined from the position of the signal echo in the recorded signal waveforms.

It is another object of the present invention to provide a method that enables successful retrieval of the signal echo returned from an agitated fluid surface located below an atmosphere filled with a medium that could cause a significant attenuation of optical beams, the method being intended for implementation in the processing unit of a lidar apparatus dedicated to level sensing applications.

Yet another object of the present invention is to provide a method that takes advantage of the intrinsic fluctuations of the signal echo returned from an agitated fluid surface to enable better retrieval of the signal echo, the intrinsic fluctuations being generally of much higher amplitude than those of the signal echo returned from an optically scattering or absorbing medium that fills in the volume above the fluid surface.

Another object of the present invention is to provide a method that enables successful retrieval of the signal echo returned from an agitated fluid surface, and which can be implemented in a lidar apparatus without any need for modifying its existing hardware or for adding new hardware components.

SUMMARY OF THE INVENTION

In accordance with a first aspect of the present invention, there is provided a method for optically measuring the level of fluids stored in tanks or containers, wherein the surface of the fluids can possibly be agitated while being located below an atmosphere that could cause significant absorption and/or scattering of optical beams. The method consists in numerically processing the digitized signal waveforms generated by a lidar apparatus that makes use of the pulsed time-of-flight modulation scheme. The data processing relies essentially on the computation of a waveform vector in which each data point is given by the value of a statistical estimator of the variability of the signal echo amplitude measured at the distance from the lidar apparatus associated to the rank of the data point in the waveform vector. The statistical estimator is preferably the standard deviation of the measured amplitude data, but other estimators of data variability can be used as well. As compared to the computation of a mean waveform vector from a set of raw signal waveforms, the computation of a statistical estimator of data variability allows for significant enhancement of the signal echo returned from an unstable specular reflector such as the surface of an agitated fluid. This is due to the fact that the collection of the optical return signals from an agitated fluid surface exhibits sizeable fluctuations. As a consequence, the useful signal echo can be more easily identified and then retrieved even when buried in a stronger signal echo returned from any optically scattering or absorbing medium that could fill in the volume of the tank above the fluid surface.

In accordance with a second aspect of the invention, there is also provided a lidar apparatus for optically measuring the level of the top surface of a fluid stored in a tank, the fluid being possibly agitated. The lidar apparatus is placed at a height above the surface of the fluid, generally on the rooftop of the tank, and the optical beam radiated from the apparatus propagates along a direction perpendicular to the surface of the fluid. The key elements of the lidar apparatus include an optical emitter module for sending a plurality of optical pulses towards the surface of the fluid, an optical receiver module for detecting a plurality of optical signals reflected off the surface of the fluid and for generating analog electrical signals in response to the input optical signals, electronics for sampling the analog electrical signals and for converting them into digital signal waveforms, and a control and processing unit for numerically processing the digital signal waveforms. The key step of the numerical data processing is the computation of a waveform vector in which each data point is given by the value of a statistical estimator of the variability of the signal echo amplitude measured at the distance from the lidar apparatus associated to the rank of the data point in the waveform vector. The signal echo returned from the surface of the fluid stored in the tank can be retrieved with greater reliability for further determination of the vertical distance that separates the surface of the fluid from the lidar apparatus.

Other features and advantages of the invention will be further appreciated by reference to the detailed descriptions of the preferred embodiments in conjunction with the drawings thereof.

DETAILED DESCRIPTION OF THE PREFERRED EMBODIMENTS

Figure 1:
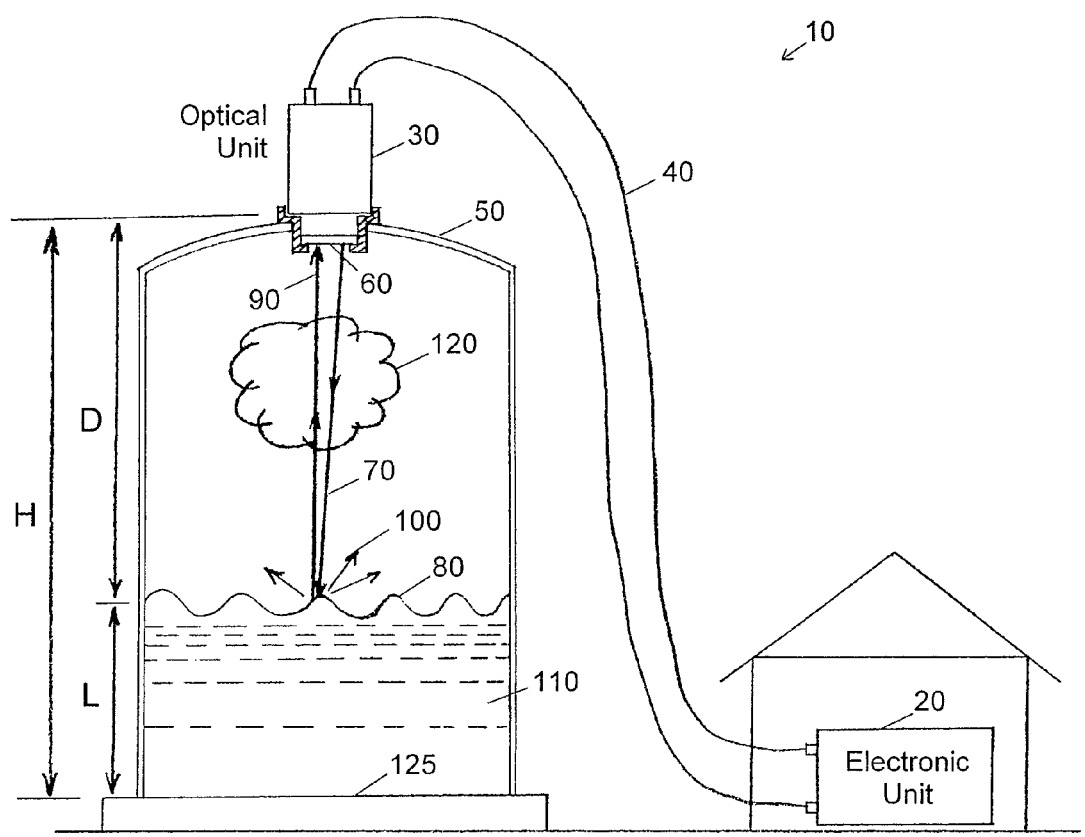
FIG. 1 is a schematic illustration of a set-up for a lidar tank-gauging device for non-contact measurement of the surface level of a material stored in a tank.

FIG. 1 is a schematic illustration of a liquid-level measurement application that represents a preferred mode of practicing the invention with its various embodiments. A lidar tank-gauging device 10 is shown in FIG. 1 with a preferred design configuration wherein the device is made up of an electronic unit 20 remote from an optical unit 30, the units being linked to each other only through light transmission means 40. The light transmission means 40 consist preferably of two optical fibers. The optical unit 30 is mounted on the roof of a liquid storage tank or vessel 50, and a window 60 made of a suitable optical material provides optical access to the interior of the tank 50. Although the storage tank shown in FIG. 1 is stationary, the apparatus of the present invention can be used with tanks or containers mounted in transportation means as well. Likewise, both electronic unit 20 and optical unit 30 can be enclosed in the same housing located on the roof of the tank 50 without departing from the scope of the present invention. During operation of the lidar tank-gauging device 10, the optical unit 30 emits pulses of light in a repetitive manner. The emitted light propagates in the form of a collimated optical beam that is depicted schematically in FIG. 1 by the vertical arrow 70 that points downward. The tank 50 contains a liquid 110 whose surface 80 reflects some part of the incident optical beam 70 to generate a return optical beam depicted by the arrow 90 that points upward. The stored material can also be in the form of slurry, but for the sake of convenience the text will refer only to a liquid. As seen in FIG. 1, the surface of the liquid can be agitated for various reasons. As a consequence, the amount of light reflected back towards the optical unit 30 can exhibit significant time fluctuations because a part of the incident light beam 70 would be diverted in various directions, in a random manner, as depicted schematically by the short-length arrows 100.

Instead of being mounted on the roof of the tank 50, as depicted in FIG. 1, an optical unit 30 adapted for installation on the floor 125 of the tank can also be contemplated without departing from the scope of the present invention. Unless the optical unit 30 could be located in a compartment made in the floor 125 and closed by a sealed window 60, the optical unit 30 is otherwise always immersed in the liquid, so that it must be enclosed within a hermetically-sealed housing. The device is oriented in such a way that the emitted light propagates upward throughout the height of the liquid. This configuration is particularly attractive for use with tanks that do not allow for easy roof-mounting of an optical unit 30, or when the height H of the front panel of the optical unit 30 relative to the tank floor 125 is subject to changes, due for example to thermal expansion of the sidewalls of the tank. In turn, the liquid must be sufficiently transparent at the wavelength of the emitted light even when the tank 50 is close of being completely filled.

The invention described herein finds its best use when implemented in lidar tank-gauging devices 10 that operate according to the pulsed TOF modulation scheme. The vertical distance D that separates the surface 80 of the stored liquid 110 from the front panel of the optical unit 30 is then obtained by measuring the time delay T the optical pulses take to travel a full round trip of length 2D. The vertical distance D is computed with the following formula:

$$D = \frac{cT}{2n}, \quad (1)$$

where c is the speed of light in vacuum ($\approx 3 \times 10^8$ m/s), while n denotes the path-averaged refractive index of the atmosphere above the liquid surface 80, in which the optical pulses propagate. The value of D can be used as a measure of the tank ullage, namely for determining the amount that the tank lacks of being full. As shown in FIG. 1, the height or level L of the liquid surface 80 can be obtained simply from L=H−D.

Figure 2:
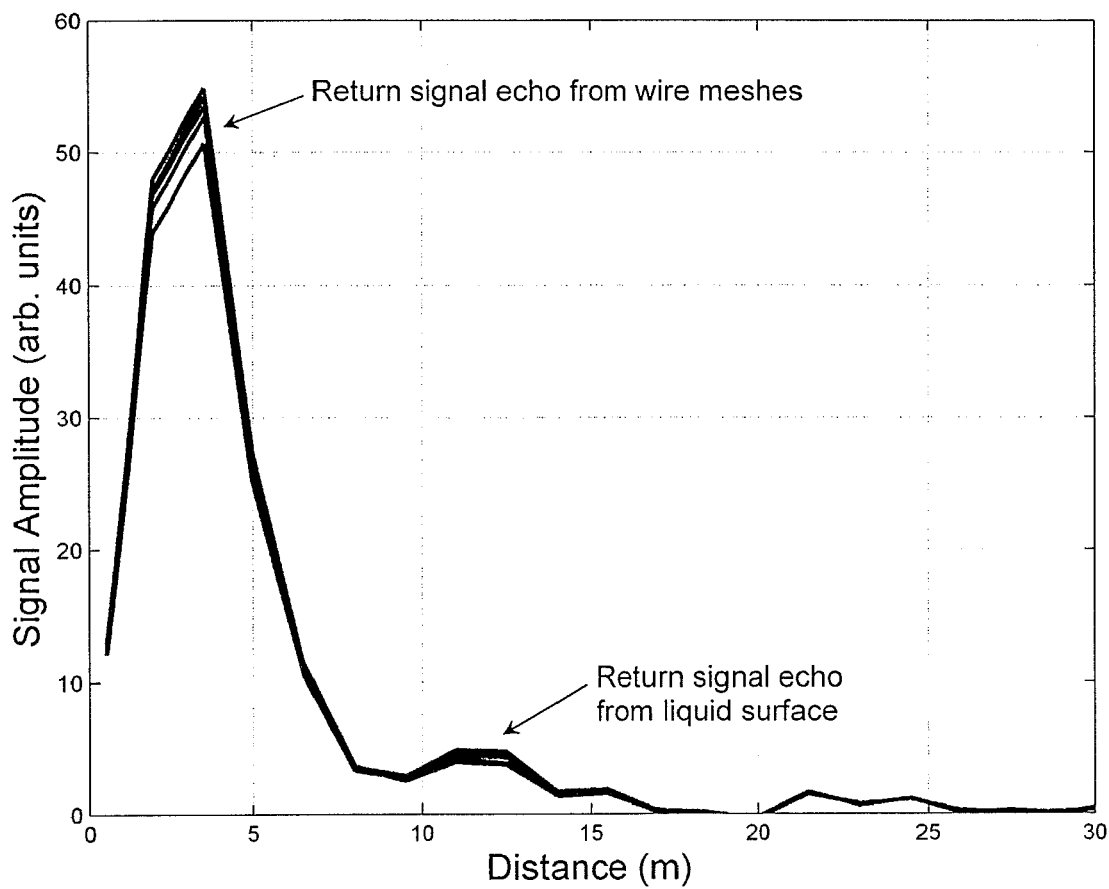
FIG. 2 shows five signal waveforms recorded by a lidar tank-gauging device placed at a height of about 11.7 m above a bucket filled with water, wherein a part of the optical beam was intercepted by a set of four metallic wire meshes located approximately 7 m above the surface of the water. Each waveform shown in the figure was computed from the average of 100 raw signal waveforms.

The volume between the surface 80 of the stored liquid 110 and the top of the tank 50 is generally filled with air or with other gas mixtures. In some circumstances, the overlying atmosphere may also contain varying concentrations of particulate matter, dust, or a medium that is condensing in the form of fog or droplets, as depicted schematically in FIG. 1 by the cloud 120. As noted earlier, the medium in which the optical pulses propagate during their double travel between the device and the liquid surface can absorb and/or scatter a part of the pulse energy. This can result in an important reduction of the amplitude of the useful signal echo returned from the surface 80, while a more or less intense parasitic signal echo may arise from the backscattered pulse energy that is captured by the optical unit 30. For the sake of better illustrating the detrimental impacts of this parasitic signal echo, a lidar instrument designed for ranging over short distances and equipped with a laser diode source emitting at a near-infrared 905-nm wavelength has been installed above a small bucket filled with fresh water. The depth of the water was 80 cm. The line of sight of the instrument was pointing downward on the bucket, and the vertical distance between the instrument and the water surface was about 11.7 m. The presence of an optically-scattering atmosphere above the water surface, that would significantly degrade the visibility conditions, was simulated by inserting in the optical beam path a set of four metallic wire meshes, one above the other, at a height of about 7 m above the water surface level. The meshes provide a strong return of the incident optical beam energy while a small part of the beam energy passes through them to impinge on the water surface. FIG. 2 shows a set of five typical signal waveforms recorded during operation of the lidar instrument under the conditions mentioned in the preceding lines. Each waveform represents the measured amplitude of the collected optical signal plotted as a function of the distance from the lidar instrument. Each curve shown in the figure was obtained by averaging 100 consecutive raw signal waveforms in order to increase by a factor of 10 the signal-to-noise ratio characteristics of the displayed signal waveforms. The signature of the signal echo returned from the water surface is visible without difficulty as the small-amplitude peak located at the distance $z \approx 11$-12 m from the lidar instrument. However, the salient feature of the waveforms shown in FIG. 2 is the strong signal echo returned from the wire meshes, which peaks at the distance $z=3.5$ m. This strong signal echo exceeds that of the water surface by a factor of more than 10. As a consequence, without any cue from the operator, the processing unit of the lidar instrument is likely to erroneously identify the useful signal echo as the one corresponding to the wire mesh return, thus resulting in this case in a largely incorrect level measurement. In practical situations the optically-scattering medium would completely fill the volume above the surface of the liquid, so that the parasitic signal echo visible in the recorded waveforms would extend from the distance $z=0$ m up to the distance corresponding to the liquid surface level. In fact, the signal echo returned from the liquid surface level could be completely buried within the extended parasitic signal echo, thus making its reliable identification quite difficult, if not possible. As will be shown below, the invention disclosed herein relates to dedicated processing of the signal waveforms that would enable successful recovery of the (possibly weak) signal echoes returned from liquid surfaces.

Figure 3:
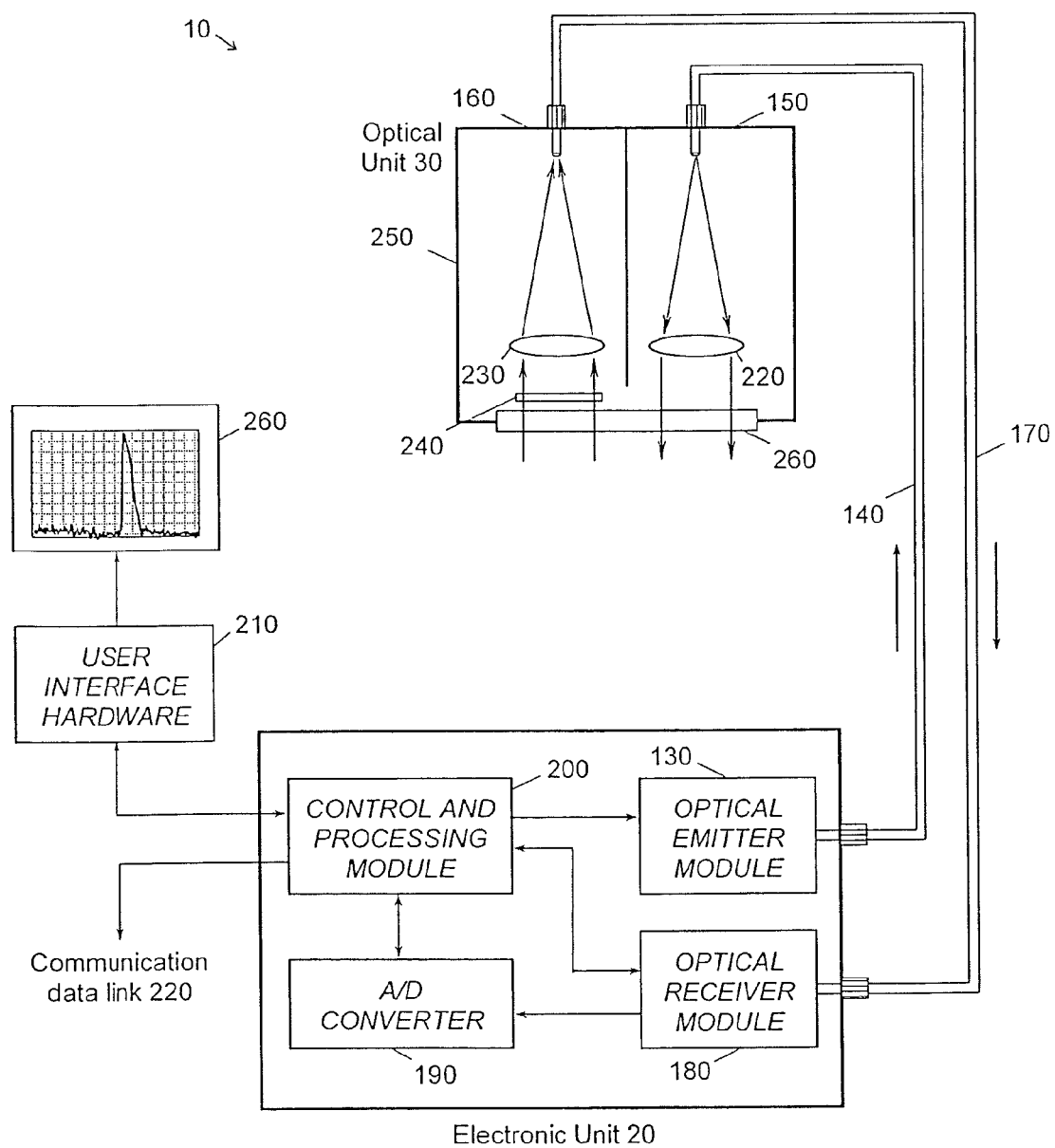
FIG. 3 is a functional block diagram that details the internal configuration of a lidar tank-gauging instrument according to a preferred embodiment of the invention.

The functional block diagram of FIG. 3 depicts the internal configuration of a lidar tank-gauging device 10 that would be built according to a preferred embodiment of the present invention. The operation of the device can be better understood by logically splitting the components enclosed in the electronic unit 20 in a set of distinct modules, each module having its specific role. For instance, the optical emitter module 130 receives electrical pulse trigger signals from the control and processing module 200 to command the repetitive emission of optical pulses. The duration of the optical pulses is typically in the order of a few ns (nanoseconds) while the pulse repetition frequency (PRF) of the module 130 can reach some tens or even hundreds of kHz. The optical pulses are emitted from an optical source coupled to proper drive electronics, the source being generally a laser, and preferably a semiconductor laser diode. However, other types of optical sources such as light-emitting diodes (LEDs) can be envisioned without departing from the scope of the present invention. The selection of the optical source depends on factors such as the peak optical output power required for successful level sensing of typical surfaces located at the maximum stand-off distance $D_{MAX}$ to be covered by the instrument, the emission wavelength, the ease to get efficient coupling of the emitted light into an optical fiber, and its cost. Optical sources such as fiber lasers, microchip lasers and even solid-state lasers may find their way in this application domain, particularly when no laser diode source exists at the desired emission wavelength. After exiting from the optical source, the optical pulses pass through appropriate optics that focuses them onto the input end of the optical fiber 140. This fiber conveys the optical pulses with minimum attenuation and coupling losses up to the emission channel 150 of the optical unit 30.

The return signal echo captured by the collection channel 160 of the optical unit 30 is guided through another optical fiber 170 up to the input aperture of the optical receiver module 180 housed in the electronic unit 20. The key component of the optical receiver module 180 is a photodetector, which is generally an avalanche or PIN photodiode having its material composition suited to the wavelength of the optical pulses. The pre-amplified voltage signal at the output of the photodetector circuitry is fed to an amplifier circuit that may comprise a matched filter to limit the electrical bandwidth of the optical receiver module 180. It is known in the art that other amplifier configurations could be used as well, such as a logarithmic amplifier or a set of amplifiers mounted in parallel, each amplifier having a fixed gain. The invention described herein is specifically intended for implementation in lidar tank-gauging devices that perform digitization of the collected lidar signal waveforms. The electronics of these instruments thus includes an analog-to-digital (A/D) converter 190 that digitizes the amplified analog output signal from the optical receiver module 180 to allow further numerical processing of the data by the control and processing module 200. The digitized lidar signal waveforms are generated by sampling repetitively the amplified analog output signal during a period of time whose duration relates to the maximum distance to be covered by the instrument. The A/D converter 190 has preferably a sampling rate of several tens of MS/s (mega-samples per second) or higher. The time delay between two consecutive digital sampling events defines the size of the so-called range bins of the instrument 10, when converted in units of distance with Eq. (1). For example, the analog signal waveforms have been sampled at a rate of 100 MS/s (10-ns time spacing) to give the waveforms shown in FIG. 2, wherein the range bin is then 1.5-m wide. In addition to processing the data sent by the A/D converter 190, the control and processing module 200 controls the operation of both emitter 130 and receiver 180 modules while managing the input/output communications and data logging via user-interface hardware 210 or through a data link 220 for connection to a network or to any other processing means.

FIG. 3 also depicts a simplified layout of the optical unit 30, which consists basically of an emission channel 150 and of a collection channel 160 placed side by side, each having its own optical axis. The lidar tank-gauging device 10 with its optical unit 30 as depicted in FIG. 3 thus has a monostatic biaxial configuration. However, the apparatus of the present invention could also be based on a monostatic coaxial configuration in which both emission and collection channels share a common portion of their optical axes. Both optical channels 150 and 160 include, as a minimum, lenses 220 and 230. The lens 220 serves for collimation of the light that is radiated from the endface of the fiber 140 connected to the emission channel 150. In turn, lens 230 focuses the optical energy incident on its clear aperture onto the endface of the fiber 170 that connects to the collection channel 160. Note that the clear apertures and focal lengths of both lenses 220 and 230 may differ. Likewise, the optical fibers 140 and 170 do not necessarily have the same core diameters and numerical apertures. The surfaces of both lenses preferably have anti-reflection coatings to minimize the optical reflection losses at the emission wavelength. Although the optical unit 30 depicted in FIG. 3 makes use of lenses, other optical components such as mirrors of suitable clear apertures and curvatures can be used as well without departing from the scope of the present invention. The optical unit 30 includes hardware (not shown in the figure) for mounting the optical components and to allow boresighting of both emission and collection channels. A narrowband optical filter 240 can be inserted somewhere along the optical path in the collection channel 160 to block parasitic light wavelengths lying out of a narrow spectral interval centered on the emission wavelength.

Both emission and collection channels are enclosed in a housing 250 that includes specific design features to make it compliant with the requirements of the intended application or of the intended end user. Since the optical unit 30 shown in FIG. 3 is free from any electrical component or wiring, it can be made intrinsically safe for use in explosive gas atmospheres. The housing 250 includes connectors that mate to the connectorized endfaces of both optical fibers 140 and 170 as well as proper fittings (not shown in the figure) to secure to the access port on the rooftop of the storage tank 50. A protective optical window 260 can be mounted in front of both lenses 220 and 230 to provide, for example, hermetical sealing of the housing 250. Alternatively, an optical window 60 can be mounted directly in the visual access port or tank nipple located on the rooftop of the storage tank 50, as seen in FIG. 1.

The liquid-level reading can be communicated to the user of the lidar tank-gauging device 10 in a variety of ways. For instance, the user-interface hardware 210 may simply provide a numerical display of the liquid-level reading, updated at a rate that can be either selected by the user or set automatically by the control and processing module 200 of the device. Alternatively, or in combination, the return signal waveforms can be displayed in a graphical form similar to that of FIG. 2 on a display monitor 260. In ideal conditions wherein the level of the surface of a liquid at rest is sensed without any significant scattering of the optical pulse energy by the atmosphere above the liquid surface, each return signal waveform would exhibit a single peak that stands out from a weak noise background. The horizontal position of the peak value in the waveform may give directly the vertical distance D of the liquid surface after proper distance calibration of the lidar tank-gauging device.

Figure 4:
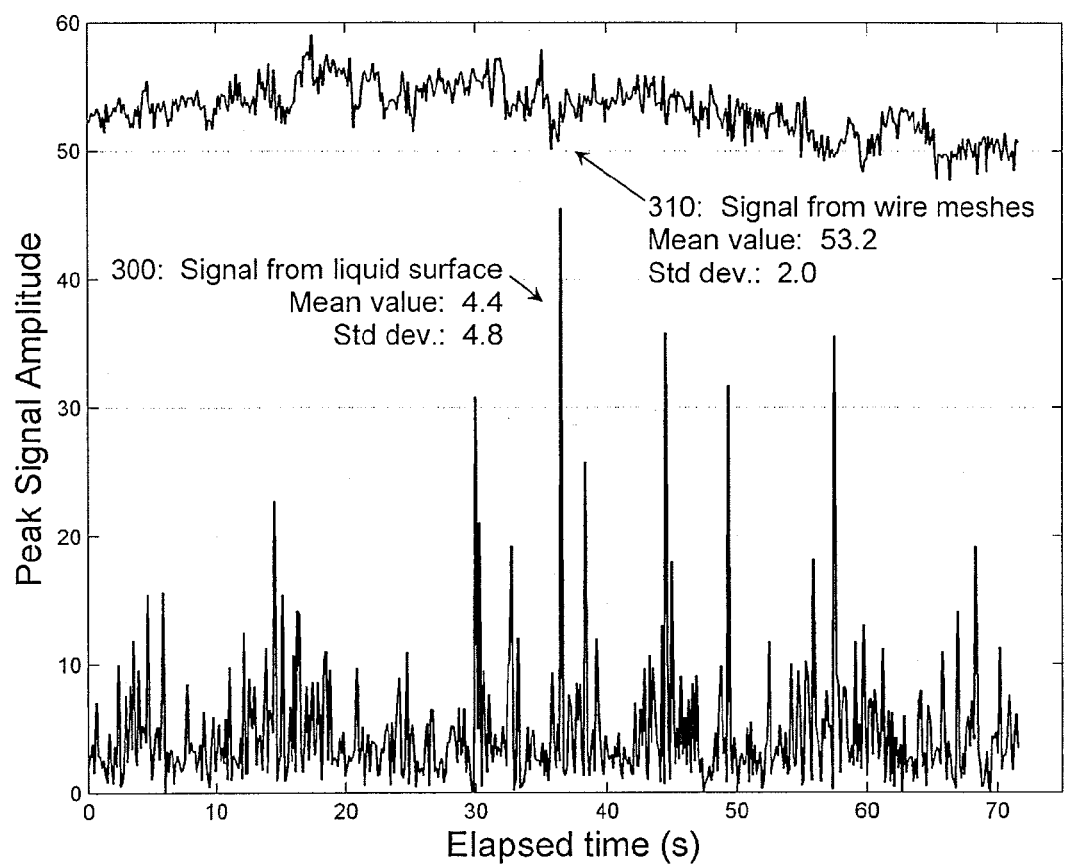
FIG. 4 plots the time variations of the peak signal amplitudes returned from an agitated liquid surface and from the metallic wire meshes. The mean value and standard deviation of each data set are given in the figure.

As noted earlier, the amplitude of the signal echo returned from an agitated liquid surface and then captured by a lidar tank-gauging device 10 can exhibit sizeable time fluctuations as compared to the relatively stable signal echo returned from the optically absorbing/scattering medium that could be present above the liquid surface. The curve 300 of FIG. 4 depicts an example of the signal amplitude fluctuations from an agitated liquid surface. The data points in this curve have been retrieved from the same set of 500 raw signal waveforms that was used to generate the averaged signal waveforms shown previously in FIG. 2. Note that the water surface was made turbulent by knocking repeatedly on the sidewalls of the water-filled bucket during the recording of the whole set of waveforms. For each raw signal waveform, the amplitude data point sampled for the specific distance z=11 m (i.e., at the peak of the signal echo returned from the liquid surface) was retrieved and then plotted in curve 300. The same operation was then performed with the data points sampled for the distance z=3.5 m, where the signal echo returned from the metallic wire meshes gets maximum, as seen in FIG. 2. This set of data points then forms the curve 310 shown in FIG. 4 as well. Note that the recording of the whole set of raw signal waveforms covered a time span of about 72 s. The heavier fluctuations of the peak amplitude of the signal echo from the agitated water surface are clearly evidenced in FIG. 4, even though the mean signal amplitude is weaker than that of the wire-mesh signal echo by a factor of about 12. As a convenient measure of the amplitude fluctuations, the standard deviation of the data points of curve 300 has been computed, giving a result that is more than twice that obtained from the data points of curve 310 (4.8 vs 2.0).

The basis of the method of the present invention consists in making use of a statistical estimator such as the standard deviation computed with the signal amplitude data points measured at each distance z. The standard-deviation values are then used to generate a waveform (denoted as the standard-deviation waveform) from which the useful signal echo returned from an agitated liquid surface is more likely to stand out from the more stable parasitic background echo. Using the symbol $S_i(z_j)$ for the $j^{th}$ sampled data point comprised in the one-dimensional vector $S_i$ that represents the $i^{th}$ digitized raw signal waveform of a set comprising a total of N waveforms, (i.e., i=1, 2, 3, ..., N), the $j^{th}$ element $S_\sigma(z_j)$ of the standard-deviation waveform vector $S_\sigma$ is given by:

$$S_\sigma(z_j) = \sqrt{\frac{1}{N-1}\sum_{i=1}^{N}(S_i(z_j)-\overline{S}(z_j))^2} \quad j=1,2,3,\ldots,N_Z, \quad (2)$$

where $\overline{S}(z_j)$ stands for the $j^{th}$ element of the mean waveform vector previously computed from the same set of N raw signal waveforms:

$$\overline{S}(z_j) = \frac{1}{N}\sum_{i=1}^{N} S_i(z_j) \quad j=1,2,3,\ldots,N_Z. \quad (3)$$

In both formulas shown above, $z_j$ stands for the distance from the lidar tank-gauging device corresponding to the $j^{th}$ signal amplitude data point, the spacing $z_{j+1}-z_j$ between successive distance elements being given by the range bin size defined earlier. Each waveform vector then comprises a total of $N_Z$ data points, $N_Z$ being obtained from the ratio of the maximum stand-off distance $D_{MAX}$ at which a return lidar signal is to be sampled to the range bin size.

The standard deviation is a basic statistical parameter commonly used as a useful estimator of the variability of the data around their mean value. However, other types of estimators of the variability could be used as well without departing from the scope of the present invention. For example, a mean absolute deviation waveform $S_A$ could be used, wherein each element $S_A(z_j)$ is computed from the expression:

$$S_A(z_j) = \frac{1}{N}\sum_{i=1}^{N}|S_i(z_j)-\overline{S}(z_j)| \quad j=1,2,3,\ldots,N_Z, \quad (4)$$

where the symbol || stands for the absolute value of the expression enclosed therein. The mean absolute deviation and the standard deviation are statistical parameters closely related to the first moment and second moment of a data set, respectively. Parameters based on higher-order moments could be used as well for quantifying the fluctuations of the measured lidar signal amplitude about its mean value. However, the use of lower-order moments is preferable in many circumstances since the robustness of this class of estimators decreases as the order of the moments gets higher.

Figure 5:
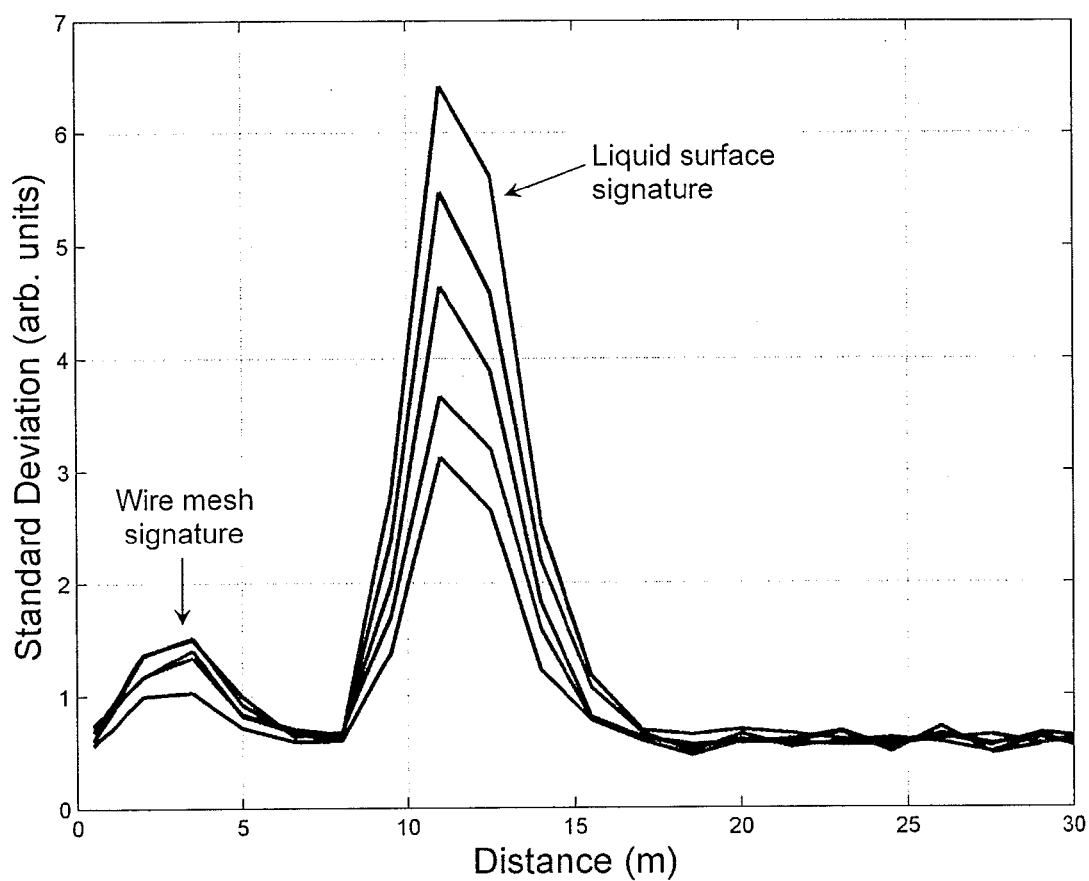
FIG. 5 shows five waveforms, wherein each of them has been obtained from the standard deviation of a set of 100 raw signal waveforms. The raw signal waveforms are the same as those used to produce the averaged waveforms shown in FIG. 2.

For the sake of illustration, FIG. 5 shows a set of five standard-deviation waveforms obtained from the same 500 raw signal waveforms used for generating the curves of both FIGS. 2 and 4. Each waveform has been obtained from the standard deviation computed with the data points included in a subset of 100 consecutive raw signal waveforms, so that each curve accounts for the amplitude fluctuations that occurred during a time span of about 14 s. As compared to the averaged signal waveforms shown in FIG. 2, the signal echoes at z=11 m returned from the agitated water surface get prominent in the standard-deviation waveforms. This means that any basic algorithm for distance evaluation that would be based, for example, on peak detection of the strongest echo in a waveform would easily succeed in providing the right distance when run with standard-deviation waveforms such as those displayed in FIG. 5. FIG. 5 also shows that the peak of the liquid surface signature varies appreciably from waveform to waveform, thus indicating that the strength of the rapid amplitude fluctuations was not stationary over the whole 72-s acquisition period. This behavior could have been guessed from the curve 300 plotted in FIG. 4, which shows larger amplitude fluctuations during the time interval from 30 s to about 60 s.

Another set of five waveforms has been computed from the same 500 raw signal waveforms as discussed above, but now using Eq. (4) for the mean absolute deviation. The mean-absolute-deviation waveforms are plotted in FIG. 6, wherein the same vertical scale as in FIG. 5 has been used to facilitate comparisons between both figures. The signal echoes returned from the agitated water surface still stand out in the displayed waveforms, but in a slightly reduced fashion as compared to the standard deviation.

Figure 6:
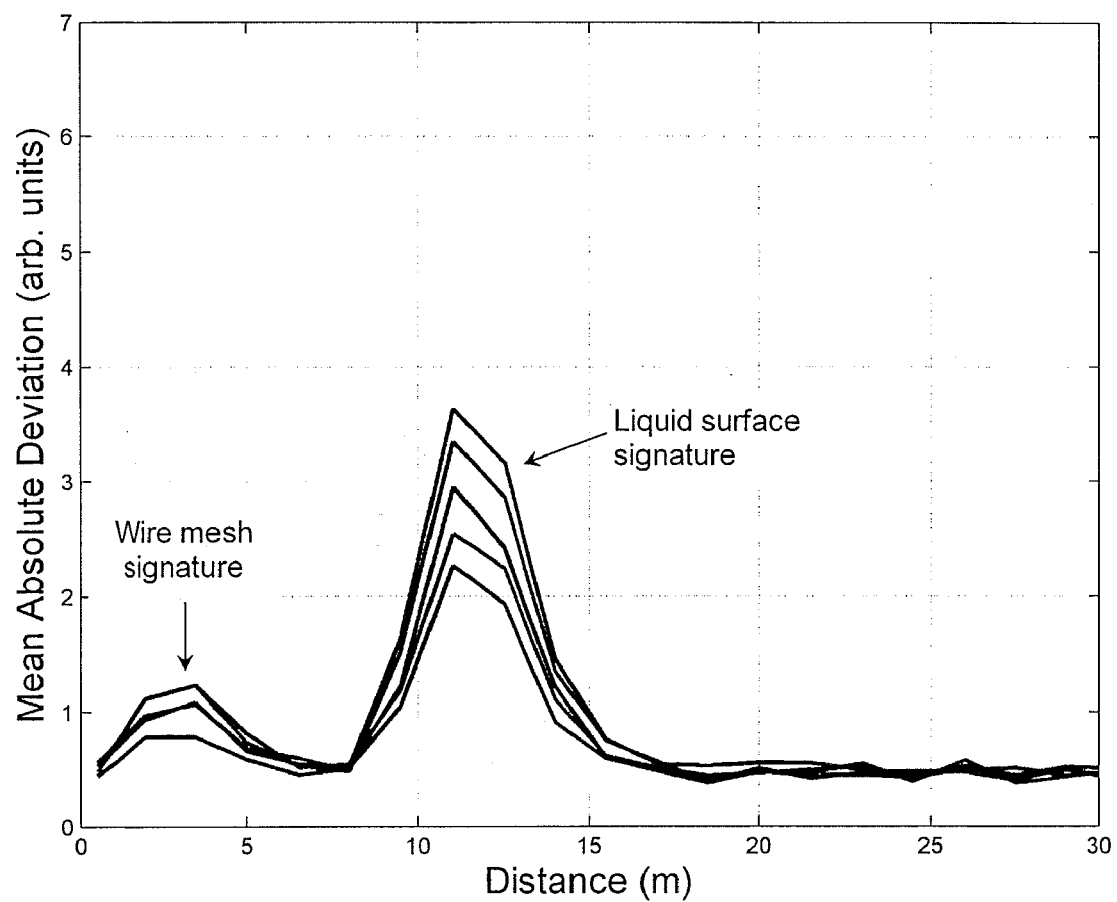
FIG. 6 shows five waveforms, wherein each of them has been obtained from the mean absolute deviation of a set of 100 raw signal waveforms. The raw signal waveforms are the same as those used to produce the waveforms shown in FIGS. 2 and 5.

The amplitude fluctuations at the origin of the waveforms plotted in FIGS. 5 and 6 do not come solely from the reflection of the lidar beam on the agitated liquid surface. Hence, additional contributions like the time fluctuations of the radiated lidar beam energy from pulse to pulse, beam pointing jitter, inhomogeneities in the atmosphere in which the lidar beam propagates, and noise either generated by or captured by the electronic circuitry of the optical receiver module 180 add to the contribution of the agitated liquid surface to give an overall time fluctuation figure that could be quantified using for example the waveforms such as those plotted in FIGS. 5 and 6. The non-vanishing values of both standard-deviation and mean-absolute-deviation waveforms for distances closer than the position z=11 m of the agitated liquid surface is a consequence of the combined effects of these additional contributions. If desired, the waveforms shown in FIGS. 5 and 6 can be normalized to remove out some of the additional time fluctuation contributions discussed above in order to better reveal the specific contribution due to the agitated fluid surface.

Figure 7:
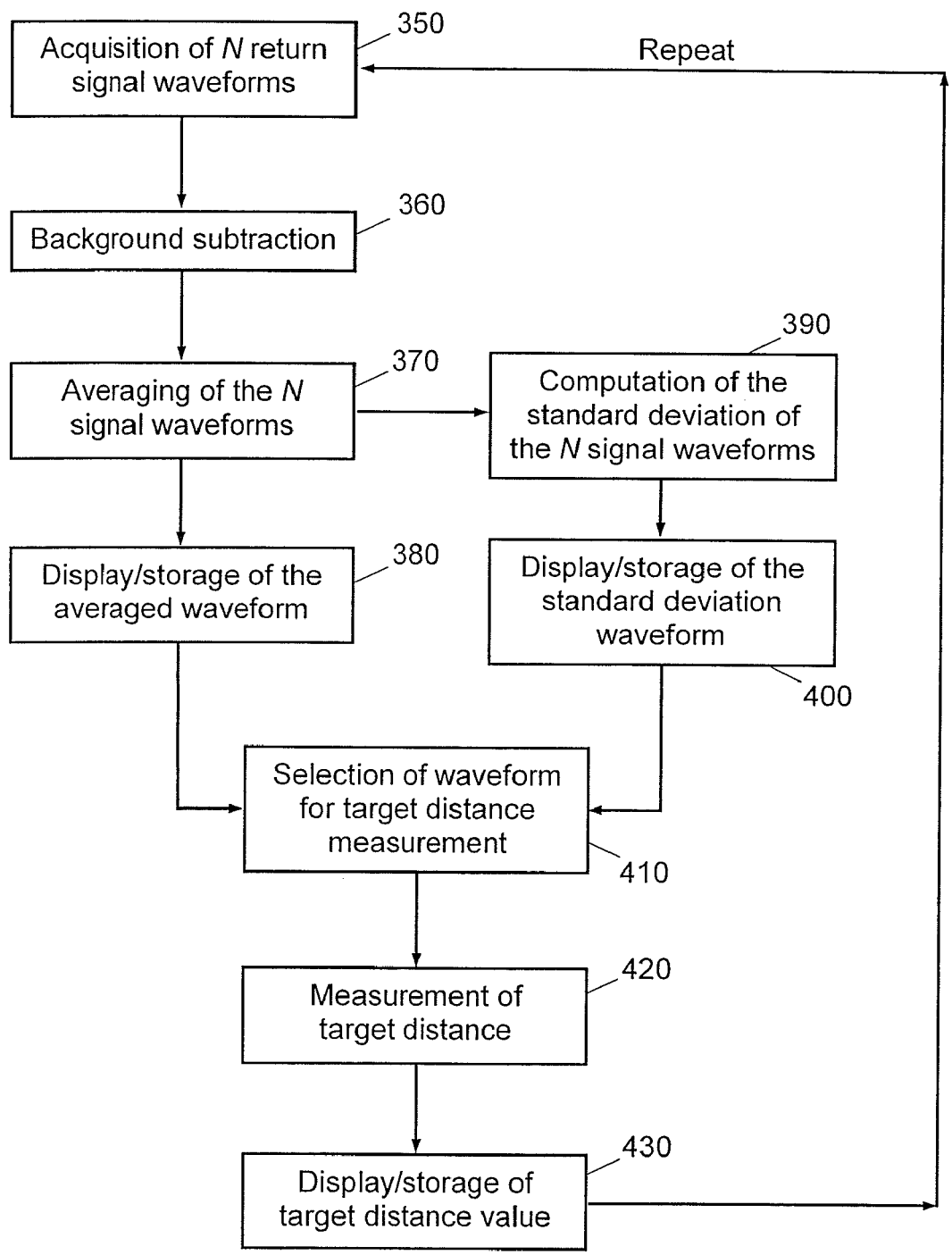
FIG. 7 is a flow chart diagram that shows the numerical processing steps of the acquired raw signal waveforms according to a preferred embodiment of the method of the invention.

FIG. 7 depicts a flowchart diagram from which the processing of the acquired signal waveforms according to the method of the present invention can be better appreciated. After having recorded a set of N raw signal waveforms in step 350, a previously acquired reference background signal is then subtracted from each waveform in step 360. The purpose of the background subtraction is to remove from each raw signal waveform a fixed pattern noise generated each time an optical pulse is fired by the emitter module 130, a part of this noise being picked up by the electronics of the optical receiver module 180 of the lidar tank-gauging device 10. This fixed pattern noise can be recorded as a reference waveform prior to the acquisition of the raw signal waveforms simply by firing an optical pulse while blocking the input aperture of the collection channel 160. The averaging step 370 is then carried out to give an averaged waveform $\overline{S}$ with enhanced signal-to-noise ratio. The waveform can be displayed on a display monitor or stored for further processing in step 380. The same set of N raw signal waveforms is then processed in step 390 to compute the standard-deviation waveform $S_\sigma$ according to Equation (2) shown previously. Note that the averaged signal waveform $\overline{S}$ computed in step 370 is required for completion of step 390. For the sake of illustration, the standard deviation is used in the flow chart diagram as an estimator of the variability of the data but, as noted earlier, other statistical estimators could be used as well without departing from the scope of the present invention. Similarly to the averaged signal waveform $\overline{S}$, the standard-deviation waveform $S_\sigma$ can be displayed on a display monitor as a function of the distance from the tank-gauging device or stored for further use in step 400. Both averaged and standard-deviation waveforms are then analyzed and compared in step 410 to determine which of them would be best suited for further determination of the distance to the target (fluid surface). A comparison of the waveforms, either performed by the user or through the use of a suitable algorithm, is suggested to avoid, among other things, erroneous measurement results that would occur from the blind use of the standard-deviation waveform in cases where the top surface of the fluid would be stable, without any agitation. The selected waveform is then processed in step 420 according to methods and algorithms well known in the art to locate the signature of the surface of the fluid and its corresponding distance value. As shown in step 430, the distance reading can be displayed to the user or stored for further use or processing.

The waveform processing detailed in the flow chart of FIG. 7 is repeated for each newly acquired set of N waveforms. However, it will be obvious to one skilled in the art that the processing flow can be modified without departing from the spirit of the invention. For example, the computations of both averaged waveform $\overline{S}$ and standard-deviation waveform $S_\sigma$ can be updated each time a new raw signal waveform is acquired instead of waiting for a new whole set of N signal waveforms. In this embodiment both waveforms $\overline{S}$ and $S_\sigma$ are computed from the latest N signal waveforms received, but the flow of the raw signal waveforms in the computations now proceeds according to a first-in first-out scheme implemented on a single raw waveform basis.

In practice, the number N of raw signal waveforms used for the computations of the waveforms $\overline{S}$ and $S_\sigma$ is governed by factors such as the desired update rate of the fluid level readings and the pulse repetition frequency of the optical emitter module 130, which dictates the acquisition rate of the raw waveforms. Choosing larger values of N would lead to enhanced signal-to-noise ratios for both computed waveforms $\overline{S}$ and $S_\sigma$, but at the price of a reduced time-resolved capability in displaying the transient phenomena that could take place inside of the tank that is currently gauged.

While the preferred embodiments of the invention in their various aspects have been described above, such descriptions are to be taken as illustrative of embodiments of the invention rather than descriptions of the intended scope of the invention, which scope is more fully appreciated by reference to the disclosure as a whole and to the claims that follow.

I claim:

1. A method for optically measuring a level of the top surface of a fluid contained in a storage means, comprising the steps of:
   (a) providing a lidar apparatus and adjusting a line of sight of said lidar apparatus substantially perpendicular to said top surface, said lidar apparatus including means for:
      (a1) sending a plurality of optical pulses towards said top surface,
      (a2) receiving a plurality of optical signals reflected by said top surface, (a3) converting said optical signals into digital waveforms,
(b) computing a computed waveform from the plurality of said digital waveforms, each element of said computed waveform being given by the value of a statistical estimator of the variability of the measured signal amplitudes stored in the corresponding elements of the said digital waveforms,
(c) locating in said computed waveform the signal echo returned from said top surface of a fluid, and
(d) determining the vertical distance that separates said top surface of a fluid from said lidar apparatus from the position of said signal echo returned from said top surface.

2. A method according to claim 1 wherein said statistical estimator of the variability of the measured signal amplitudes is the standard deviation.

3. A method according to claim 1 wherein said statistical estimator of the variability of the measured signal amplitudes is the mean absolute deviation.

4. A method according to claim 1 wherein said statistical estimator of the variability of the measured signal amplitudes is an $n^{th}$-order moment of the statistical distribution of said measured signal amplitudes, the order n of the moment being set to 2 or 4.

5. A method for optically measuring a level of the top surface of a fluid contained in a storage means, comprising the steps of:
(a) providing a lidar apparatus and adjusting a line of sight of said lidar apparatus substantially perpendicular to said top surface, said lidar apparatus including means for:
(a1) sending a plurality of optical pulses towards said top surface,
(a2) receiving a plurality of optical signals reflected by said top surface,
(a3) converting said optical signals into digital waveforms,
(b) computing a first computed waveform from the plurality of said digital waveforms, each element of said first computed waveform being given by the mean value of the measured signal amplitudes stored in the corresponding elements of the said digital waveforms,
(c) computing a second computed waveform from the plurality of said digital waveforms, each element of said second computed waveform being given by the value of a statistical estimator of the variability of the measured signal amplitudes stored in the corresponding elements of the said digital waveforms,
(d) comparing said first and second computed waveforms and locating in said first or second computed waveform the signal echo returned from said top surface of a fluid,
(e) determining the vertical distance that separates said top surface of a fluid from said lidar apparatus from the position of said signal echo returned from said top surface.

6. An apparatus for optically measuring a level of a top surface of a fluid contained in a storage means, said lidar apparatus comprising:
(a) an optical emitter module for sending a plurality of optical pulses towards said top surface,
(b) an optical receiver module for receiving a plurality of optical signals reflected by said top surface,
(c) means for sampling analog signal waveforms at the output of the optical receiver module and for converting said analog signal waveforms into digital signal waveforms,
(d) a control and processing module for numerically processing said digital signal waveforms,
wherein said numerical processing includes the computation of a waveform formed of a statistical estimator of the variability of the signal amplitude data sampled for each distance value, from which the signal echo returned from said top surface of a fluid can be retrieved for determining the vertical distance that separates said top surface from the apparatus.

7. An apparatus according to claim 6 wherein the level of the top surface of a fluid is measured according to the pulsed time-of-flight principle.

8. An apparatus according to claim 7 wherein the means for sampling said analog signal waveforms is an analog-to-digital converter.

9. An apparatus according to claim 6 wherein said optical emitter module comprises a laser source for emitting said plurality of optical pulses.

* * * * *